(12) United States Patent
Leconte

(10) Patent No.: US 7,478,881 B2
(45) Date of Patent: Jan. 20, 2009

(54) MECHANISM FOR ADJUSTING THE INCLINATION OF A MOTOR VEHICLE SEAT

(75) Inventor: Sébastian Leconte, Flers (FR)

(73) Assignee: Faurecia Sièges d'Automobile, Nanterre (FR)

( * ) Notice: Subject to any disclaimer, the term of this patent is extended or adjusted under 35 U.S.C. 154(b) by 342 days.

(21) Appl. No.: 11/384,905

(22) Filed: Mar. 20, 2006

(65) Prior Publication Data

US 2006/0226687 A1 Oct. 12, 2006

(30) Foreign Application Priority Data

Mar. 24, 2005 (FR) ................... 05 02943

(51) Int. Cl.
*B60N 2/48* (2006.01)
(52) U.S. Cl. ..................... 297/367; 297/373
(58) Field of Classification Search ............... 297/367, 297/366, 373
See application file for complete search history.

(56) References Cited

U.S. PATENT DOCUMENTS

| 4,995,669 | A | 2/1991 | Croft |
| 7,188,905 | B2 * | 3/2007 | Ham ........................ 297/367 |
| 7,364,237 | B2 * | 4/2008 | Grable et al. ............ 297/378.1 |
| 2002/0024246 | A1 | 2/2002 | Yamada et al. |
| 2003/0025377 | A1 * | 2/2003 | Peters ........................ 297/367 |
| 2003/0189372 | A1 | 10/2003 | Shephard |
| 2003/0230923 | A1 * | 12/2003 | Uramichi ................... 297/367 |
| 2004/0189072 | A1 | 9/2004 | Chiu et al. |
| 2005/0127732 | A1 * | 6/2005 | Peters ........................ 297/367 |
| 2005/0156454 | A1 * | 7/2005 | Fast ........................... 297/367 |
| 2005/0168034 | A1 * | 8/2005 | Fast ........................... 297/367 |
| 2005/0275270 | A1 * | 12/2005 | Lee ........................... 297/367 |

FOREIGN PATENT DOCUMENTS

EP 1 195 115 A1 4/2002

OTHER PUBLICATIONS

French Preliminary Search Report FR 0502943; report dated Nov. 28, 2005.

* cited by examiner

*Primary Examiner*—Laurie K Cranmer
(74) *Attorney, Agent, or Firm*—Miller, Matthias & Hull

(57) ABSTRACT

A mechanism for adjusting the inclination of a motor vehicle seat, said mechanism comprising:
  a first cheek plate and a second cheek plate, said second cheek plate being mounted to pivot on the first cheek plate;
  a locking device for preventing the first cheek plate from pivoting relative to the second cheek plate, said locking device comprising a first locking element coupled to the first cheek plate, and a second locking element mounted to move on the second cheek plate between an active position and an inactive position;
  a non-reverse device comprising a cam mounted to pivot between an active position in which said cam comes into contact with the second locking element, and an inactive position;
The cam and/or the second locking element is/are provided with teeth.

10 Claims, 2 Drawing Sheets

MECHANISM FOR ADJUSTING THE INCLINATION OF A MOTOR VEHICLE SEAT

The invention relates to a mechanism for adjusting the inclination of a motor vehicle seat.

It aims more particularly to prevent the back of the seat from coming out of adjustment in unwanted manner when high stress is exerted on the seat back.

BACKGROUND OF THE INVENTION

A mechanism is already known that comprises in usual manner:

a first cheek plate and a second cheek plate designed to be fastened one to a seat back and the other to a seat proper, said second cheek plate being mounted to pivot on the first cheek plate about a first pivot axis;

a locking device for preventing the first cheek plate from pivoting relative to the second cheek plate, said locking device comprising a first locking element coupled to the first cheek plate, and a second locking element mounted to move on the second cheek plate between an active position in which it co-operates with the first locking element to prevent the second cheek plate from pivoting relative to the first cheek plate about the first pivot axis, and an inactive position in which it allows the second cheek plate to pivot relative to the first cheek plate;

a non-reverse device for preventing the second locking element from moving from its active position towards its inactive position when torque is exerted between the first cheek plate and the second cheek plate, said non-reverse device comprising a cam mounted to pivot about a second pivot axis between an active position in which said cam presents a bearing surface coming tangentially into contact with a bearing surface of the second locking element when the second element is in the active position, and an inactive position in which said cam is spaced apart from the second locking element, so that it allows the second locking element to move from its active position to its inactive position.

The risk of the locking device coming unlocked when high stress is imparted to the seat back, in particular in the event of an impact, is reduced by the non-reverse device. However, it is very difficult to reduce that risk sufficiently to comply with the specifications of automobile makers without risking the cam jamming in the active position. The adjustment mechanism cannot therefore be used in satisfactory manner by the occupants of the vehicle because said occupants are obliged to exert a large amount of force for unlocking the mechanism using control means provided for this purpose and including the cam.

OBJECTS AND SUMMARY OF THE INVENTION

In order to reduce this risk considerably while also making the mechanism satisfactory to use, in accordance with the invention, at least one of the bearing surfaces from among the bearing surface of the cam and the bearing surface of the second locking element is provided with teeth forming projections coming substantially into contact with the other bearing surface when the cam is in the active position.

Thus, it is possible to adjust the mechanism to avoid the cam jamming in the active position while the vehicle is being used normally, while also preventing the locking device from unlocking. In the event of extreme stress, the teeth penetrate into the facing bearing surface so as to anchor therein.

According to another characteristic of the invention, only one of the bearing surfaces from among the bearing surface of the cam and the bearing surface of the second locking element is provided with teeth, the other bearing surface being substantially smooth.

Thus, the bearing surface of the cam can come tangentially into contact with the bearing surface of the second locking element, thereby avoiding any slack therebetween.

According to an additional characteristic of the invention, the bearing surface provided with teeth has hardness that is higher than the hardness of the substantially smooth bearing surface.

Thus, the penetration of the teeth into the facing smooth surface is improved.

According to another characteristic of the invention, the teeth extend parallel to the second pivot axis.

They thus define serrations extending perpendicularly to the direction along which the cam and the second locking element move relative to each other.

According to another characteristic of the invention, the teeth form projections projecting over a height lying in the range 0.02 millimeters (mm) to 0.5 mm on the bearing surface, and they are spaced apart by a distance lying in the range 0.1 mm to 1 mm.

Teeth are thus obtained that are sufficiently tall to anchor effectively and that are not too slender so that they do not break. In addition, they are reasonably close together so that a plurality of them become anchored and so that the material of the facing bearing surface can engage between them effectively.

According to another characteristic of the invention, the mechanism further comprises a resilient return device exerting a force on the cam tending to bring it into the active position.

Thus, the non-reverse device returns automatically to the active position when the second locking element is in the active position.

According to another characteristic of the invention, the second locking element is a slug mounted to move in translation along a radial axis perpendicular to the first pivot axis.

According to an alternative characteristic of the invention, the second locking element is a lever mounted to pivot on the second cheek plate about a third pivot axis that is parallel to the first pivot axis.

According to an additional characteristic of the invention, the mechanism presents the following characteristics:

the cam comes into contact with the bearing surface of the second element when it is in the active position substantially at a point of contact;

the normal to the bearing surface of the cam at the point of contact forms an angle with the line interconnecting the point of contact and the second pivot axis, which angle lies in the range 3° to 20°.

Thus, satisfactory effectiveness is obtained for the anchoring between the cam and the second locking element in the event of extreme stress, while also avoiding the risk of jamming during normal operation.

BRIEF DESCRIPTION OF THE DRAWINGS

Other features and advantages of the present invention appear from the following description of non-limiting embodiments given with reference to the accompanying drawings, in which.

MORE DETAILED DESCRIPTION

Figure 1:
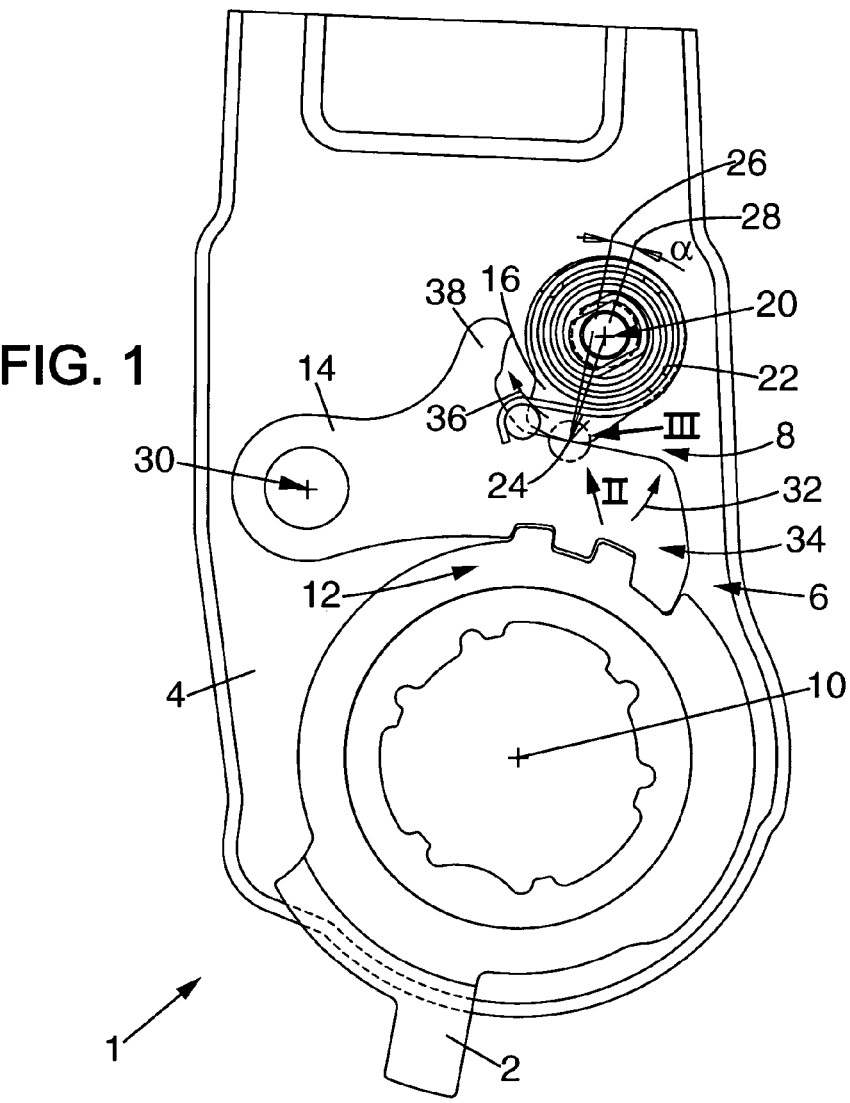
FIG. 1 shows a mechanism of the invention.
Figure 2:
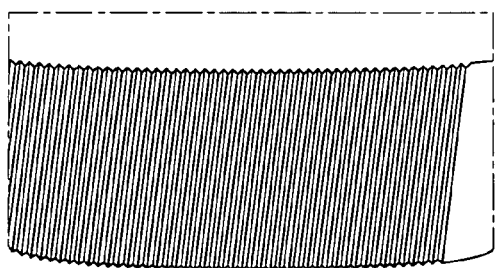
FIG. 2 is a view on a larger scale of the cam on its own, seen looking along the arrow referenced II in FIG. 1.
Figure 3:
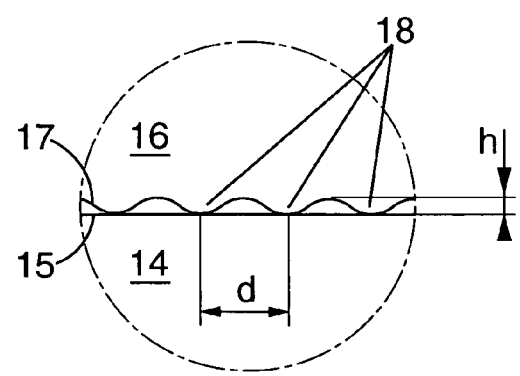
FIG. 3 is a view on a larger scale of the zone referenced III in FIG. 1.

FIGS. 1 to 3 show a mechanism 1 for adjusting the inclination of a motor vehicle seat. The mechanism 1 essentially comprises a stationary cheek plate 2, a moving cheek plate 4 mounted to pivot relative to the stationary cheek plate 2 about an inclination axis 10, a locking device 6 for preventing the moving cheek plate 4 from pivoting relative to the stationary cheek plate 2, and a non-reverse device 8.

The stationary cheek plate 2 is designed to be fastened to the seat proper. The moving cheek plate 4 is designed to be fastened to the seat back.

The locking device 6 essentially comprises a crenellated portion 12 provided on the stationary cheek plate 2 and a catch 14 mounted to pivot relative to the moving cheek plate 4 about a pivot axis 30 parallel to the inclination axis 10. The catch 14 is provided with a crenellated portion 34 that is complementary to the crenellated portion 12 of the stationary cheek plate 2.

When the locking device 6 is in an active position, as shown in FIG. 1, the crenellated portion 34 of the lever 14 is engaged in the crenellated portion 12 of the stationary cheek plate 2 and prevents the moving cheek plate 4 from pivoting relative to the stationary cheek plate 2 about the inclination axis 10.

When the lever 14 reaches an inactive position by pivoting about the pivot axis 30 in an unlocking direction shown by the arrow referenced 32, the crenellated portion 34 of the lever 14 is spaced apart from the crenellated portion 12 of the stationary cheek plate 2. It is then possible for the moving cheek plate 4 to pivot relative to the stationary cheek plate 2 about the pivot axis 10.

The non-reverse device 8 essentially comprises a cam 16 that is mounted to pivot relative to the moving cheek plate 4 about a pivot axis 20 parallel to the inclination axis 10 and to the pivot axis 30.

A spiral spring 22 urges the cam 16 to pivot about the pivot axis 20 towards an active position in which it prevents the lever 14 from leaving its active position.

When the cam 16 is in the active position, it comes into contact via a bearing surface 17 with a bearing surface 15 of the lever 14. In the plane of FIG. 1, perpendicular to the pivot axis 20, the cam 16 comes into contact with the lever 14 via their respective bearing surfaces 17, 15 at a point of contact 24 such that the normal 26 to the bearing surface 17 of the cam 16 at the point of contact 24 forms an angle α with the line 28 interconnecting the point of contact 24 and the pivot axis 20. Said angle α is referred to as the "jamming angle" and it advantageously lies in the range 3° to 20°.

When, by pivoting about the pivot axis 20 in a retraction direction 36, the cam 16 reaches an inactive position, in which its bearing surface 17 is spaced apart from the bearing surface 15 of the lever 14, the lever 14 can then pivot about the pivot axis 30 in the unlocking direction 32 towards its inactive position. Indeed, the lever 14 is caused to pivot towards its inactive position by the cam 16 pivoting in the retraction direction 36, after moving far enough apart from the abutment surface 15 of the lever 14, the bearing surface 17 of the cam 16 then pushing on a stud 38 provided on the lever 14.

As shown more precisely in FIGS. 2 and 3, the bearing surface 17 of the cam 16 is provided with teeth 18 defining serrations extending parallel to the pivot axis 20.

On the bearing surface 17, said teeth 18 form projections of height h advantageously lying in the range 0.02 mm to 0.5 mm. The serration lines are spaced apart from one another at a distance d advantageously lying in the range 0.1 mm to 1 mm.

In addition, the cam 16, or at least the teeth 18 of the bearing surface 17, preferably have hardness lying in the range 700 Vickers hardness (Hv) to 1050 Hv, obtained by treatment, and advantageously by carbo-nitriding.

Conversely, the bearing surface 15 of the lever 14 is smooth. It preferably has hardness lower than the hardness of the teeth of the cam. It can be subjected to heat treatment or to chemical and heat treatment.

Thus, the teeth 18 have hardness at least three times higher than the hardness of the bearing surface 15 of the lever.

Figure 4:
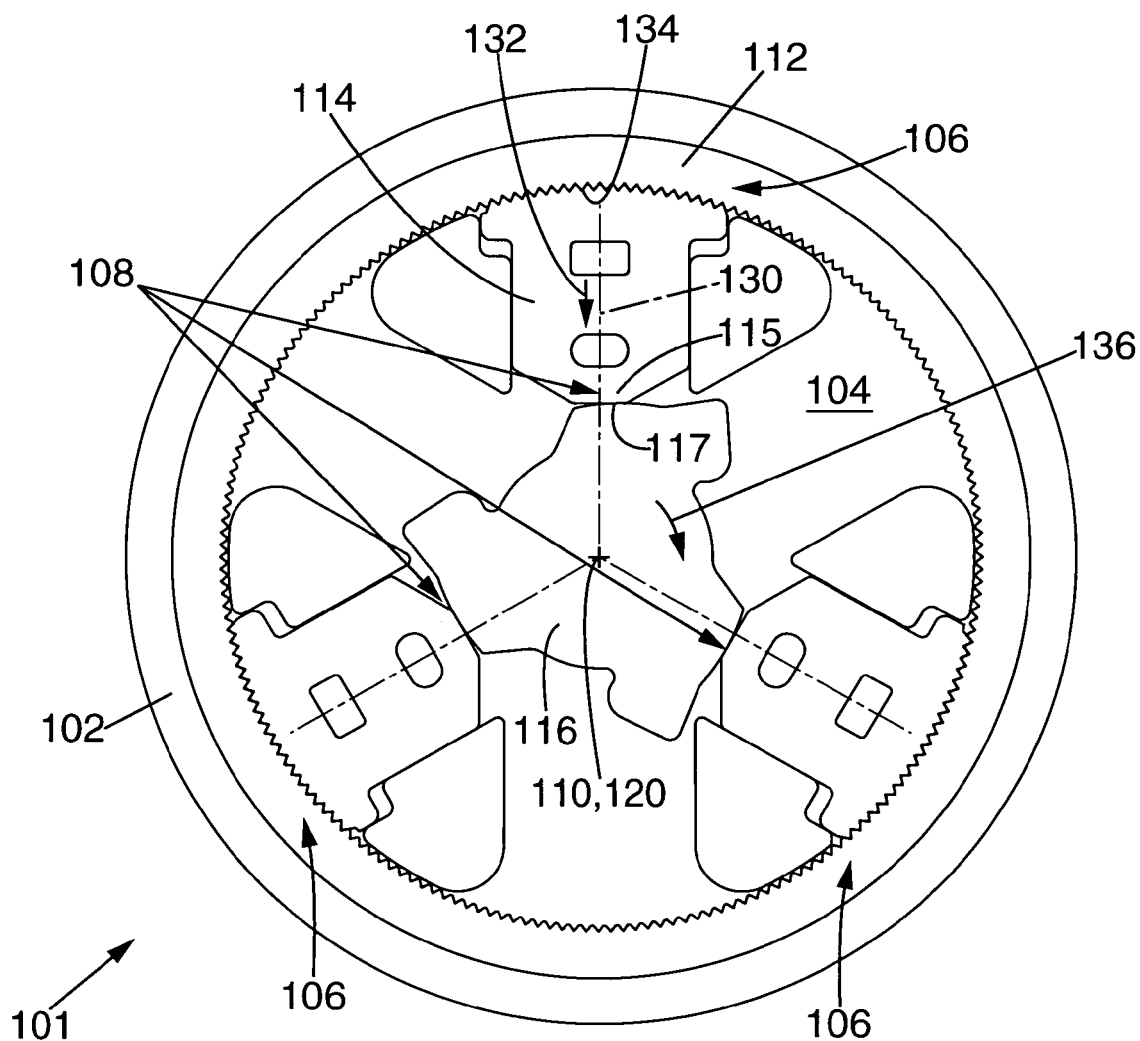
FIG. 4 is a variant mechanism of the invention.

The elements of the mechanism 101 that are shown in FIG. 4 and that correspond to the elements of the mechanism 1 are designated by like references plus 100.

The locking device 106 for locking the mechanism 101 comprises a toothed ring 112 secured to the stationary cheek plate 102 and, in this example, three slugs 114, each of which is provided with teeth 134.

Each of the slugs 114 is mounted to move in translation relative to the cheek plate 104, in an unlocking direction 132, along a radial axis 130, between an active position in which the teeth 134 of the slugs 114 and the teeth of the ring 112 engage into one another, and an inactive position in which they are spaced apart from one another.

The cam 116 of the non-reverse mechanism 108 is mounted to pivot on the moving cheek plate 104 about a pivot axis 120 that coincides with the inclination axis 110 of the moving cheek plate 104 relative to the stationary cheek plate 102. The cam 116 is urged to pivot towards its active position shown in FIG. 4 by a torsion spring.

When it is in its active position, the bearing surface 117 of the cam 116 exerts a force on the bearing surfaces 115 of the slugs 114, tending to bring them into the active position.

The cam 116 is brought into the inactive position by pivoting about the pivot axis 120 in the retraction direction 136.

The characteristics of size, surface state, and hardness of the bearing surfaces 115 and 117 of the mechanism 101 are similar to those of the bearing surfaces 15, 17 of the mechanism 1.

What is claimed is:

1. A mechanism for adjusting the inclination of a motor vehicle seat, said mechanism comprising:
    a first cheek plate and a second cheek plate designed to be fastened one to a seat back and the other to a seat proper, said second cheek plate being mounted to pivot on the first cheek plate about a first pivot axis;
    a locking device for preventing the first cheek plate from pivoting relative to the second cheek plate, said locking device comprising a first locking element coupled to the first cheek plate, and a second locking element mounted to move on the second cheek plate between an active position in which it co-operates with the first locking element to prevent the second cheek plate from pivoting relative to the first cheek plate about the first pivot axis, and an inactive position in which it allows the second cheek plate to pivot relative to the first cheek plate;
    a non-reverse device for preventing the second locking element from moving from its active position towards its inactive position when torque is exerted between the first cheek plate and the second cheek plate, said non-reverse device comprising a cam mounted to pivot about a second pivot axis between an active position in which said cam presents a bearing surface coming tangentially into contact with a bearing surface of the second locking element when the second element is in the active position, and an inactive position in which said cam is spaced apart from the second locking element, so that it allows the second locking element to move from its active position to its inactive position;

wherein at least one of the bearing surfaces from among the bearing surface of the cam and the bearing surface of the second locking element is provided with teeth forming projections coming substantially into contact with the other bearing surface when the cam is in the active position.

2. A mechanism according to claim 1, wherein only one of the bearing surfaces from among the bearing surface of the cam and the bearing surface of the second locking element is provided with teeth, the other bearing surface being substantially smooth.

3. A mechanism according to claim 2, wherein the bearing surface provided with teeth has hardness that is higher than the hardness of the substantially smooth bearing surface.

4. A mechanism according to claim 1, wherein the teeth extend parallel to the second pivot axis.

5. A mechanism according to claim 1, wherein the teeth form projections projecting over a height lying in the range 0.02 mm to 0.5 mm on the bearing surface, and they are spaced apart by a distance lying in the range 0.1 mm to 1 mm.

6. A mechanism according to claim 1, wherein the second pivot axis is parallel to the first pivot axis.

7. A mechanism according to claim 1, further comprising a resilient return device exerting a force on the cam tending to bring it into the active position.

8. A mechanism according to claim 1, wherein the second locking element is a lever mounted to pivot on the second cheek plate about a third pivot axis that is parallel to the first pivot axis.

9. A mechanism according to claim 1, wherein, in a plane perpendicular to the second pivot axis: the cam comes into contact with the bearing surface of the second element when it is in the active position substantially at a point of contact; the normal to the bearing surface of the cam at the point of contact forms an angle with the line interconnecting the point of contact and the second pivot axis, which angle lies in the range 3.degree. to 20.degree.

10. A mechanism for adjusting the inclination of a motor vehicle seat, said mechanism comprising:

a first cheek plate and a second cheek plate designed to be fastened one to a seat back and the other to a seat proper, said second cheek plate being mounted to pivot on the first cheek plate about a first pivot axis;

a locking device for preventing the first cheek plate from pivoting relative to the second cheek plate, said locking device comprising a first locking element coupled to the first cheek plate, and a slug mounted to move in translation along a radial axis perpendicular to the first pivot axis between an active position in which it co-operates with the first locking element to prevent the second cheek plate from pivoting relative to the first cheek plate about the first pivot axis, and an inactive position in which it allows the second cheek plate to pivot relative to the first cheek plate;

a non-reverse device for preventing the slug from moving from its active position towards its inactive position when torque is exerted between the first cheek plate and the second cheek plate, said non-reverse device comprising a cam mounted to pivot about a second pivot axis between an active position in which said cam presents a bearing surface coming tangentially into contact with a bearing surface of the slug when the slug is in the active position, and an inactive position in which said cam is spaced apart from the slug, so that it allows the slug to move from its active position to its inactive position, the first and second axes being coincident with each other;

wherein at least one of the bearing surfaces from among the bearing surface of the cam and the bearing surface of the slug is provided with teeth forming projections coming substantially into contact with the other bearing surface when the cam is in the active position.

* * * * *